Figure 1:
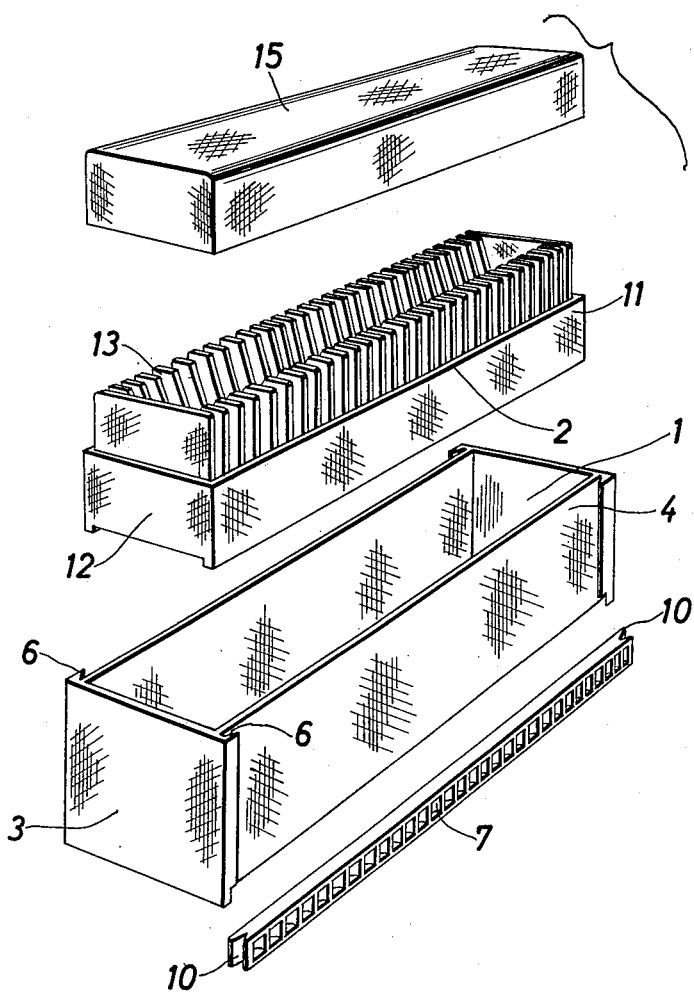

Nov. 21, 1961  R. KREMP ET AL  3,009,274
SLIDE CHANGER MAGAZINE
Filed Dec. 18, 1958  3 Sheets-Sheet 1

INVENTORS
RUDOLF KREMP
BY  FRIDOLIN HENNIG.

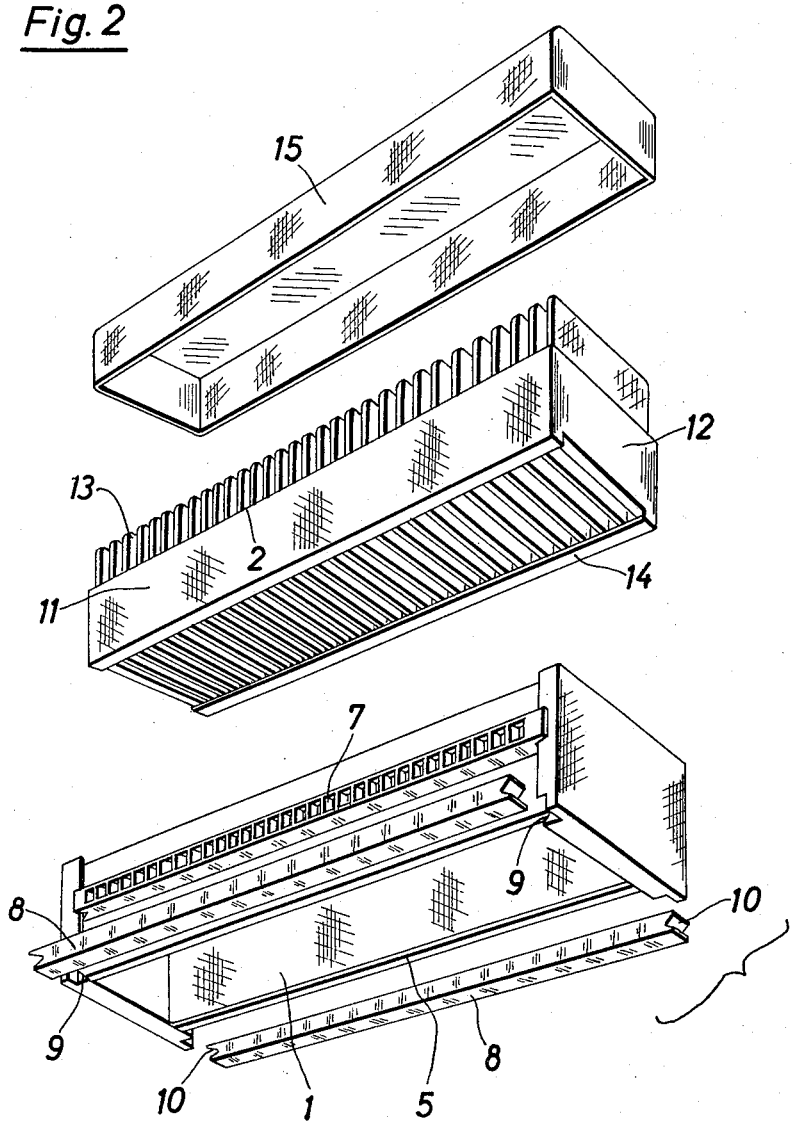

Nov. 21, 1961   R. KREMP ET AL   3,009,274
SLIDE CHANGER MAGAZINE
Filed Dec. 18, 1958   3 Sheets-Sheet 3
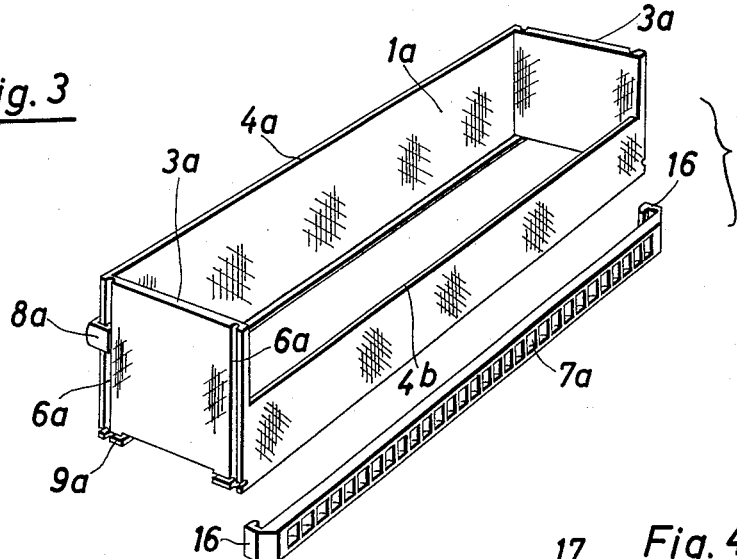
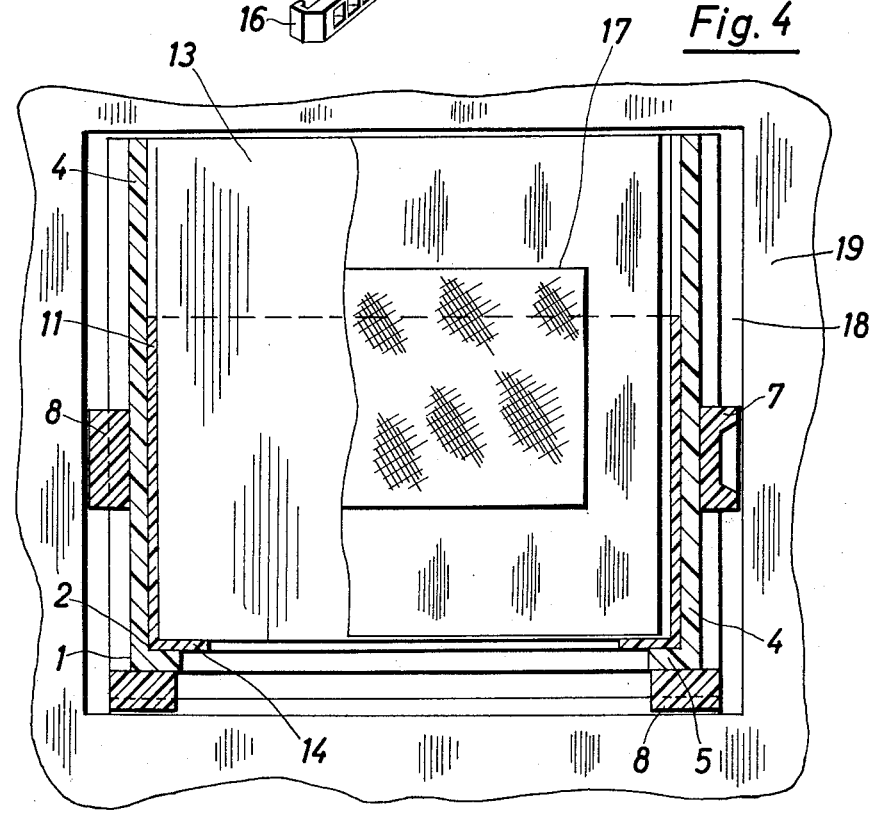
INVENTORS
RUDOLF KREMP
BY FRIDOLIN HENNIG

3,009,274
SLIDE CHANGER MAGAZINE
Rudolf Kremp and Fridolin Hennig, Munich, Germany, assignors to Agfa Aktiengesellschaft, Leverkusen-Bayerwerk, Germany
Filed Dec. 18, 1958, Ser. No. 781,363
Claims priority, application Germany Dec. 21, 1957
6 Claims. (Cl. 40—79)

The present invention relates to slide projector equipment and more particularly to a slide changer magazine for use with slide projector equipment.

Projectors for the projection of transparencies are commonly equipped with automatic or semi-automatic slide changers to which slides are fed from interchangeable magazines adapted to hold simultaneously a substantial number of transparancies or slides having transparencies mounted thereon. While slides will be referred to generally in this specification, it will be understood that this term equally applies to transparencies not mounted in slide frames but generally handled in the same manner.

Slide changer magazines are commonly of a type in which a plurality of slides is arranged along the length of the magazine in parallel transverse positions. Means are provided for step-wise longitudinal advance of the magazine through a recess in the slide changer for successive alignment of individual slides with a mechanism for transversely removing the individual slides and placing them into the optical axis of the projector.

Because of the cooperation required between co-acting elements of the magazine and the slide changer and of the lack of accepted standards for magazines for this purpose, each type of slide changer usually requires a different type of magazine even though the slides handled are of the same size. Such a variety of magazine types not only increases the cost of the magazines because of the necessity of producing a variety of magazines in relatively short respective runs, each run requiring different tools, dies, molds and the like, but it also constitutes a serious inconvenience to lecturers and others who have to present the same series of slides on different types of projection equipment requiring different magazines.

Several types of magazines now on the market differ from each other only in minor dimensional properties or even only in the position of guide means or rack means respectively employed for advancing the magazine in a changer mechanism or for guiding it therein.

It is an object of the present invention to provide a slide changer magazine which is usable with a variety of slide holders.

It is another object of the present invention to provide a slide changer magazine which is applicable to a variety of slide changers.

Another object of the invention is the provision of such a magazine which is readily assembled by the user from interchangeable component parts.

Yet another object is the provision of a magazine which is more durable than corresponding magazines now in use.

An additional object is the provision of such a magazine including simple and inexpensive storage means for a plurality of slides in fixedly spaced relationship.

A further object is the provision of such a magazine which is rugged and resistant to deterioration during prolonged use.

With these and other objects in view, the invention provides an elongated slide changer magazine for use with a slide changer having elements engageably cooperating with the magazine for longitudinal movement of the latter, the magazine including an elongated slide container; engaging means on the outside of the slide container in longitudinal position for engagement with the cooperating elements of the slide changer and a slide holder interchangeably insertable in said container in a fixed position.

In another aspect, the invention further comprises engaging means being releasably attachable to the container, the latter may be adapted to a variety of slide changers by correspondingly shaped attached engaging means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an exploded view of a preferred embodiment of the invention in isometric representation, as seen from one side and from above, FIG. 2 is a similar view of the device of FIG. 1 as seen from one side and from below, FIG. 3 shows elements of another embodiment of the invention, and FIG. 4 is a transverse sectional view of the device of FIG. 1 in the assembled condition in operating position in a slide changer.

Referring now to the drawings and more particularly to FIGS. 1 and 2, there is shown a slide container or carrier member 1 having two end walls 3 joined by two side walls 4 and a bottom wall 5 best seen in FIG. 2. The bottom wall 5 is formed with a longitudinal opening extending substantially from one end wall 3 to the other so as to leave but two narrow strips along the side walls 4.

The end walls 3 project beyond both side walls 4 and the bottom wall 5, and the opposite faces of the projecting portions of the end walls 4 are formed with grooves of substantially triangular cross-section extending along the length of the side walls and the bottom wall, the grooves along the side walls being designated by numeral 6, and those along the bottom wall by numeral 9.

Guide rails 8 and a rack 7 of resilient material such as semi-hard rubber, polyvinyl chloride, or one of the polyamide materials commercially available as "nylon" are engageable with the projecting portions of the end walls 3. The guide rails 8 and rack 7 are formed with forked end portions 10 engageable in the projecting portions of the end walls in such a manner that one of the fork elements in each end portion 10 enters the grooves 6 or 9 and the other fork element abuts wedgingly against the transverse surface of the side wall as best seen in the rack 7 of FIG. 2.

The length of the guide rails 8 and rack 7 is slightly greater in the relaxed condition than the spacing of corresponding elements of end walls 3 of container 1 so that the rails and the rack are under compressive stress when assembled with the container 1 and are firmly held in position by their inherent resiliency.

Any required number of guide rails and racks may be arranged on the container 1, and a variety of differently shaped and dimensioned rails and racks may be interchangeably assembled within a few instants with any given container 1 to adapt the container to the specific configuration of the recess in a slide changer in which the magazine is to move longitudinally during successive projection of the slides available in the container.

Since the grooves fully extend over three sides of the end walls 3, guide rails and racks may be positioned differently according to the requirements of the slide changer.

A slide holder 2 which closely fits inside container 1 carries partitions 13 in spaced parallel alignment transverse to the longitudinal axis of the magazine. Slides are individually inserted between adjacent partitions 13 in a well known manner. The tops of the partitions other than the first and last one are notched to facilitate insertion and removal of the slides. The side walls 11 and end walls 12 of the slide holder 2 are lower than the partitions 13 which also facilitates manipulation of the slides.

A separate cover 15 is so dimensioned that it may be slid over the partitions 13 into sealing abutment against the top edges of slide holder 2 which when equipped with its cover forms a convenient storage box for slides.

In the inserted position, the slide holder 2 rests on the lateral strip portions of the bottom 5 by means of rails 14 which project downwardly and inwardly from side walls 11 of slide holder 2 and prevent downward movement of inserted slides. The individual slides between partitions 13 are thus accessible both from the top and the bottom for transfer into the optical path of the projector in the conventional manner when in alignment with suitable transfer means associated with the slide changer.

The slide holder 2 is preferably molded integrally with the partitions 13 of plastic material such as polyethylene. It will be noted that the slide holder 2 does not have to sustain any appreciable mechanical stresses other than those involved in handling, and may thus be produced at very low cost, and from a minimum amount of material.

The embodiment of the invention illustrated in FIG. 3 is very similar to that of FIGS. 1 and 2, and corresponding elements are designated by like numerals followed by a lower case letter. FIG. 3 shows a slide container 1a adapted for insertion therein of a slide holder 2 as shown in FIGS. 1 and 2.

Slide container 1a differs from the container 1 of FIG. 1 by a side wall 4b of reduced height for easier access to the slide holder contained therein. The cooperation of the slide container 1a with rack 7a and guide rail 8a is also somewhat modified.

Grooves 6a and 9a extend along respective side and bottom edges of the outside face of end wall 3a, which does not project beyond the side walls, and are of approximately semi-circular cross section. The guide rail 8a and rack 7a have respective end portions 16 bent over so as to be capable of engaging grooves 6a, 9a with matingly shaped projections. The distance between the tips of the two projections on each rail or rack being smaller than that of the mating portions of the end walls 3a, the rack 7a and rail 8a are under tension when in the assembled position and are held in place by their own resiliency.

In the embodiment of the invention illustrated in FIG. 3, the end walls 3a project beyond the bottom wall only adjacent the side walls 4a, 4b of the slide container. This limits the positions available for the interchangeable slide rails or racks. Such an arrangement will be frequently found adequate where the central space adjacent the opening in bottom wall 5 has to be kept free to accommodate a slide changer element entering through this opening for transfer of individual slides out of or into the slide changer magazine.

FIG. 4 illustrates in a transverse cross sectional view the slide magazine of the invention in its operating position in a recess 18 of slide changer mechanism 19 which in itself may be of a well-known type and does not require any further illustration. A partly broken away partition 13 reveals a slide 17 which may, for example, be a frame of 35 mm. color film mounted in a cardboard carrier of substantially quadratic shape, 2" wide. The slide 17 is held in container 1 by means of the holder, 2, the bottom rails 14 of the holder 2 being supported on lateral strips of bottom wall 5 of the container. Since the container 1 is of smaller cross section than the opening or recess 18 in which it is to be slidably guided, the container is provided with guide rails 8 which, in conjunction with rack 7 act as spacers and adapt the outer contour of the container 1 to recess 18 for proper engagement of rack 7 with a pinion or other indexing drive of the slide changer, and for correct alignment of the individual slides 17 with the transfer mechanism of the slide changer which inserts them in the optical path of the projector.

The slide changer magazine of the invention has been described and illustrated in a position for upward insertion of slides into the optical path of the projector, but it is evident that the invention does not depend on any particular orientation in space of the magazine.

It will also be apparent to those skilled in the art that the inventive slide magazine is not limited to any of the specific materials of construction enumerated and preferred. It would be possible to replace, for example, a rack of resilient material by a rigid metallic rack having resilient portions without departing from the spirit of the invention.

The slide changer magazine of the invention assigns the various functions of such a magazine to different independent structural elements which are readily assembled or interchanged as conditions may require. The storage function is concentrated in the slide holder which therefore may be cheaply mass-produced to specifications which need not consider requirements of mechanical strength or resistance to wear. This relatively intricately shaped part may be produced by inexpensive molding methods from inexpensive material. Relative strength and rigidity is required of the slide housing which because of the great simplicity of its shape lends itself to production by such methods as the compression molding of thermosetting plastics. The only elements of the magazine subject to any appreciable wear are small and easily replaceable. The device in its entirety is rugged and durable. The division of the functions of the various elements permits most economical selection of materials and methods of production. This is an important advantage of the invention in addition to the great versatility in the use of the magazine. A set of guide rails 8, racks 7 and one slide container 1 are all that is needed to project the slides contained in any desired number of slide holders 2 on a wide variety of projector and slide changer types.

It will be understood that each of the elements described above, or two or more together, may also find a useful application in other types of slide changer magazines differing from the types described above.

While the invention has been illustrated and described as embodied in a slide changer magazine having a specific slide arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An elongated slide changer magazine for use with a slide changer having guide elements for supporting said slide changer magazine for longitudinal movement in said changer and transporting elements for step-by-step movement of said slide changer magazine, said slide changer magazine comprising, in combination, a carrier member; supporting means on said carrier member adapted to engage the guide elements of a slide changer for supporting said carrier member for longitudinal movement in said changer; engaging means on said carrier member adapted to engage the transporting means of said slide changer for step-by-step movement of said carrier member in said slide changer; a slide holder; and means for interchangeably attaching said slide holder to said carrier member for support thereby during the step-by-step movement of said carrier member in said slide changer.

2. A slide changer magazine as set forth in claim 1, wherein said supporting means is removably connected with said carrier member.

3. A slide changer magazine as set forth in claim 1, wherein said engaging means is removably connected with said carrier member.

4. A slide changer magazine as set forth in claim 1, wherein said carrier member is an elongated slide container, said slide container and said slide holder having an open side and each formed with an elongated aperture opposite the respective open side, said elongated apertures being substantially aligned with each other when said slide holder is inserted through the open side of and into said slide container.

5. A slide changer magazine as set forth in claim 4, wherein said supporting means comprises at least one guide rail and said engaging means comprises an elongated rack, said guide rail and said rack removably connected to the outer side and extending longitudinally of said slide container.

6. A slide changer magazine as set forth in claim 4, wherein said engaging means consists of resiliently deformable material.

References Cited in the file of this patent

UNITED STATES PATENTS

| | | |
|---|---|---|
| 2,724,989 | Badalich | Nov. 29, 1955 |
| 2,774,472 | Badalich | Dec. 18, 1956 |
| 2,858,628 | Rideout | Nov. 4, 1958 |